April 15, 1930.  J. G. FRANK  1,754,675
ELECTROMAGNETIC TRANSMISSION
Filed May 3, 1928
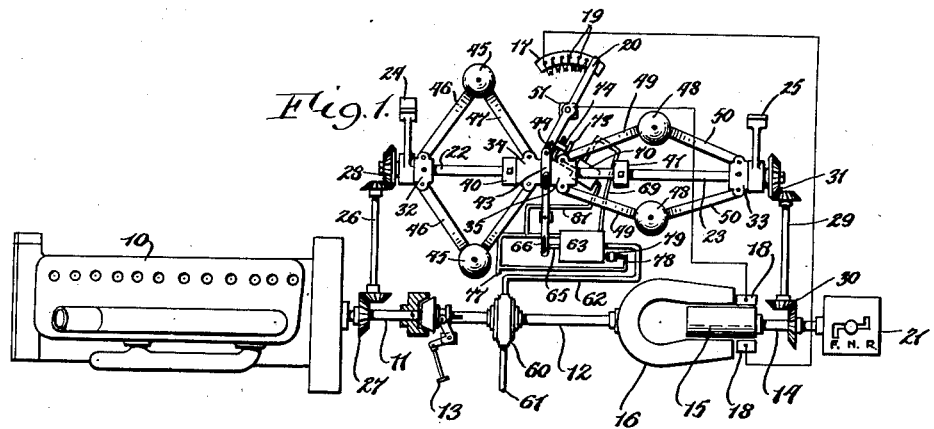
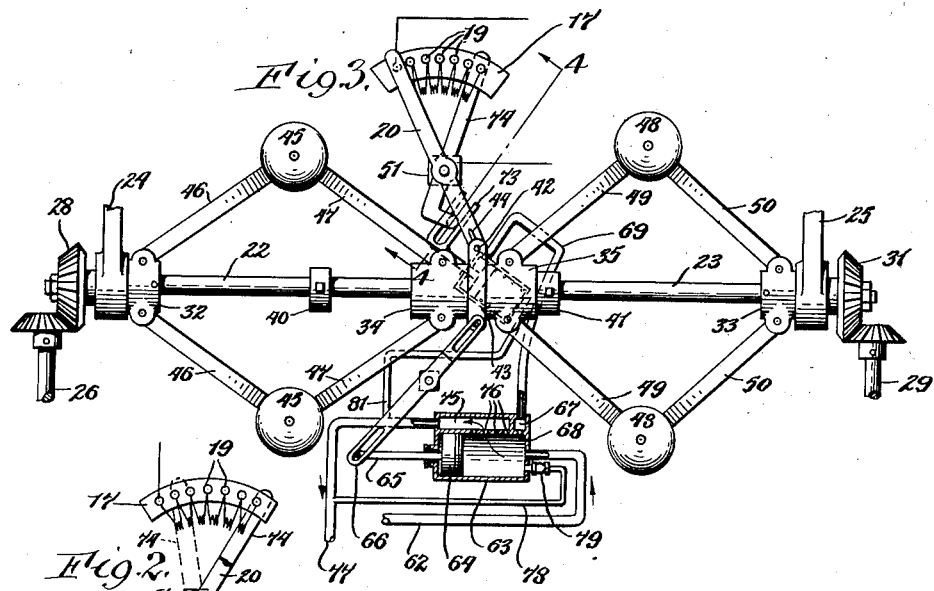
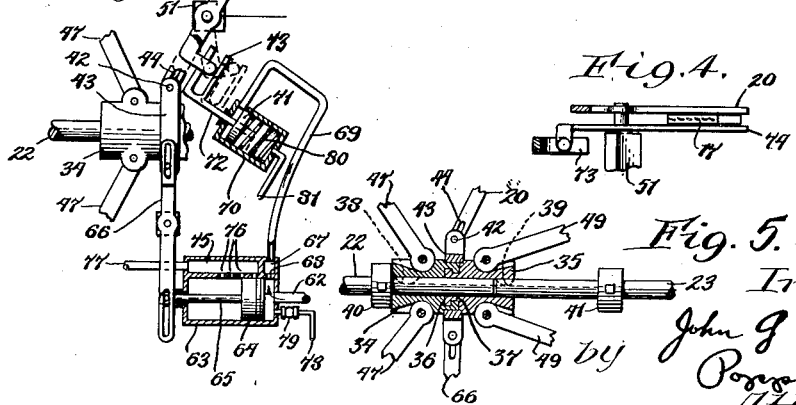

UNITED STATES PATENT OFFICE

JOHN G. FRANK, OF BUFFALO, NEW YORK

ELECTROMAGNETIC TRANSMISSION

Application filed May 3, 1928. Serial No. 274,736.

This invention relates to an electro-magnetic power transmission gearing which is more particularly designed for use in automobiles or other automotive vehicles, although the same may also be used to advantage in other installations where it is desirable to control the transmission of power in response to the load or torque on the driven element, particularly under a starting load or torque.

The present invention is an improvement on the magnetic power transmission gearing shown and described in Letters Patent of the United States No. 1,623,669, issued to me on April 5, 1927.

In magnetic power transmission gearing, as heretofore constructed, the increase in speed of the driven element has been effected by a manually operated variable resistance whereby the transmission of power from the lower speed was gradually increased by cutting out the resistance so that the highest speed was obtained when the greatest amount of resistance had been cut out.

The principal object of this invention is to provide an electro-magnetic transmission gearing in which the rate of speed transmission is automatically controlled so as to effect a smooth and rapid increase in speed from low speed or while starting without strain on the motor or the driving or driven parts in the transmission.

A further object is to provide such an electro-magnetic transmission gearing in which the field of the electro-magnetic coupling is automatically increased when starting the vehicle to overcome the initial starting load or torque, and then subsequently decreased and thereafter gradually increased proportionately to the increase in speed of the driven shaft until the field magnet obtains the maximum pull on the armature of the electromagnetic coupling and transmits power at the highest rate of speed. By this means, the maximum power transmission for overcoming the starting load or torque is provided and upon overcoming the starting load, the transmission is reset to gradually and smoothly build up the power transmission and effect a rapid and smooth "pick up" of the vehicle.

A further aim is to provide such an electromagnetic power transmission which is simple in construction, reliable and noiseless in operation, and will not get out of order under conditions of constant service.

In the accompanying drawings:

Figure 1 is a diagrammatic plan view of the invention embodied in the driving mechanism of an automobile and showing the transmission in its inoperative position. Figure 2 is a fragmentary view similar to Fig. 1 showing portions of the mechanism broken away and other portions in section, the parts being shown in the position which they occupy when starting the vehicle. Figure 3 is an enlarged view similar to Fig. 1 showing the transmission in its normal running position. Figure 4 is a section on line 4—4 of Fig. 3. Figure 5 is a fragmentary longitudinal section through the controlling shafts and sliding sleeves which control the operation of the transmission.

Similar reference numerals indicate similar parts in each of the several views.

In its general organization this invention comprises means controlled through motion derived from the driving shaft for starting the transmission of power from the driving to the driven shaft while the minimum resistance is cut into the circuit of the armature forming part of the electro-magnetic coupling between these shafts so that the minimum slippage occurs at this time between the field magnet and the armature of the electric coupling in order to overcome the initial starting load or torque on the driven shaft and means responsive to the speed of the driven shaft for subsequently cutting in resistance and thereafter automatically and gradually cutting out this resistance so that the slippage is reduced and transmits power at the highest rate of speed.

In the accompanying drawings the numeral 10 represents a prime mover of any suitable character such as a gas engine, 11 the crank or power shaft of the engine which in the present instance forms the main driving shaft, 12 an intermediate driving shaft which may be connected or disconnected with the main shaft 11 by a manually operated clutch 13 of any suitable construction, and 14 the main driven or transmission shaft which is adapted to be coupled with the driving shaft 11 and from which power is transmitted in any well known manner to the particular parts which are to be driven.

Between the intermediate driving shaft and the driven transmission shaft is arranged a magnet coupling or electric transmission device of any usual and well known construction and which consists essentially of an armature 15 secured to the driven shaft 14, and a field magnet 16 arranged externally of the armature and mounted on the intermediate shaft. The strength of this coupling is controlled by a rheostat or variable resistance 17 having one end connected with one of the brushes 18 of the armature and provided with a plurality of contacts 19 on different sections of its resistance elements, and a movable contact 20 having preferably the form of a lever which is pivotally mounted on a support 51 and traverses the fixed contacts 19 and is electrically connected with the other brush 18 of the armature as indicated diagrammatically in Fig. 1.

Upon closing the clutch 13 when the engine is running the field magnet will be rotated around the armature and the latter will be pulled around by the field magnet in accordance with the resistance which is included in the circuit of the armature. When the maximum resistance is included in the armature the slippage of the field magnet around the armature is greatest and the lowest speed is imparted to the driven shaft by the driving shaft. But when the resistance is gradually cut out of the armature the grip of the field magnet on the armature becomes progressively more powerful and thus increases the speed of the driven shaft accordingly.

If desired a speed reversing gear 21 may be arranged in a part of the driving line, for example, in the driven shaft 14, which permits of turning the driven shaft either forwardly or backwardly or stopping the same while the driving shaft is turning continuously in the same direction.

Although my invention may be variously organized the form shown in the drawings, for example, is suitable for accomplishing the purpose and as there shown the same is constructed as follows:

The numerals 22, 23 represent driving and driven controller shafts which are preferably arranged end to end and parallel with the driving and driven transmission shafts, and which may be journaled in bearings 24, 25, or otherwise rotatably supported. Motion is transmitted from the main driving shaft 11 to the driving controller shaft 22 by a transverse shaft 26 connected at one end by intermeshing bevel gear wheels 27 with the main driving shaft and at its opposite end by intermeshing bevel gear wheels 28 with the driving controller shaft. In like manner motion is transmitted from the driven transmitting shaft 14 to the driven controller shaft 23 by a transverse shaft 29 connected at one end by intermeshing bevel gear wheels 30 with the driven shaft and at its other end by intermeshing bevel gear wheels 31 with the driven controller shaft.

At outer extremities of the driving and driven controller shafts the latter have affixed thereto collars 32, 33 which turn with these shafts and are incapable of moving lengthwise thereon.

Slidable lengthwise on the opposing ends of the controller shafts are driving and driven shifting sleeves 34, 35, which are compelled to move lengthwise together but are capable of turning independently of each other. This is accomplished in the present instance by a shouldered annular neck 36 on the driven shifting sleeve engaging with an undercut annular socket 37 on the driving shifting sleeve, as shown in Fig. 5. If desired the driving shifting sleeve may be splined at its outer end to the driving controller shaft, as shown at 38 and the driven shifting sleeve may be splined on the driven controller shaft, as shown at 39, so that each of these sleeves is compelled to turn with its respective shaft. The longitudinal movement of these shifting sleeves is preferably limited by engagement of the front and rear ends of the same with stops or collars 40, 41, arranged on the driving or driven controller shafts. The longitudinal movement of the driving sleeves is transmitted to the contact lever of the resistance by a pin 42 supported by means of a band 43 on the driving shifting sleeve and engaging with a slot 44 on the inner end of the resistance contact lever.

The numerals 45, 45 represent a pair of driving governor weights movable laterally from opposite sides of the driving controller shaft under centrifugal force and each pivotally connected by a front link 46 with the respective longitudinally immovable collar 32 on the companion driving controller shaft, and also pivotally connected by a rear link 47 with the respective driving shifting sleeve.

The numerals 48, 48 represent a pair of driven governor weights movable laterally from opposite sides of the driven controller shaft by centrifugal force and each pivotally connected by a front link 49 with the driven shifting sleeve and pivotally connected by a rear link 50 with the driven collar 33 on the last mentioned shaft.

The mechanism for initially cutting out the resistance to overcome starting loads is constructed as follows:

An oil pump 60 is driven by the intermediate shaft 12, the oil being supplied to this pump from any suitable source by a pipe 61 and being forced through a delivery pipe 62. The other end of this delivery pipe connects with one end of a cylinder 63 which houses a piston 64. To this piston is secured a piston rod 65 which projects outwardly from the opposite end of the cylinder and has a pin and slot connection with a lever 66. This lever is pivotally mounted at its center and its opposite end has a pin and slot connection with the band 43 so as to be actuated by the longitudinal movement of the sleeves 34 and 35.

On one side of the cylinder 63 and at that end which connects with the pressure pipe 62, a chamber 67 is provided which communicates with the interior of the cylinder through a port 68 in the cylinder wall. This chamber 67 is connected by a pipe 69 with one end of a second cylinder 70 which houses a piston 71. The piston rod 72 of this piston extends through a gland provided in the corresponding end of the cylinder and at its outer end is formed to provide a jaw or fork 73. This fork engages a roller or other suitable projection on the end of a second contact lever 74 which is pivoted to the support 51 and at its other end traverses the contacts 19 of the rheostat 17. This lever is in circuit with one of the brushes 18 of the armature 15 in the same manner as the contact lever 20 so that as these levers traverse the rheostat contacts 19, the field of the armature will be varied.

The inward movement of the piston 64 is limited by the engagement of the lever 66 with the stuffing box of the cylinder as shown in Fig. 2 so that the port 68 is at all times uncovered and oil can pass from the supply pipe 62 through the port 68, chamber 67, and into the pipe 69.

The cylinder 63 is also formed to provide a by-pass chamber 75 which connects with the return pipe 77 which pipe returns the oil to its source. This by-pass chamber communicates with the interior of the cylinder 63 through a series of ports 76 which are arranged in a longitudinal row so that as the piston traverses the cylinder a greater or less number of these ports are uncovered and a graduated by-pass effect thereby secured. To take care of the excess pressure generated by the oil pump 60 in case the load should not be started after the piston 71 has been forced to its extreme inward position and all resistance cut out of the circuit, a by-pass pipe 78 is provided between the pressure end of the cylinder 63 and the return pipe 77, this by-pass pipe 78 containing a safety valve 79 which is set so that if the pressure in the system exceeds that necessary to move the piston 71 to its extreme inward position, this safety valve will open and the oil will be by-passed through the pipe 78 and the pressure thereby maintained at the pressure necessary to keep the piston 71 in its extreme inward position. To normally hold the piston 71 in the cylinder 70 in its outward position, a spring 80 is interposed between the cylinder head and the piston and any oil in that end of the cylinder 70 passes out through a pipe 81 which connects with the return pipe 77 and thereby prevents the formation of a head of oil in the cylinder 70 which would render the piston 71 inoperative.

The operation of the electro-magnetic transmission gearing just described is as follows:

When the engine is started and the same is disconnected from the load to be driven, the several parts of the transmission mechanism are in the position shown in Fig. 1. As there shown, the clutch 13 is open or uncoupled, the lever of the gear shift 21 is in neutral, the driving governor weights 45 are moved to their outermost position through motion derived from the engine shaft 11 and the driven governor weights 48 are in their innermost position, whereby the contact lever 20 is in a position in which the greatest resistance is cut into the armature of the magnetic coupling. Inasmuch as the pump 60 is idle, there is no pressure in the oil system and consequently the spring 80 in the cylinder 70 acting against the piston 71 forces the lever 74 to the position where the greatest resistance is cut into the armature of the magnetic coupling.

The clutch 13 is then let in or closed and the intermediate shaft 12 is rotated. This actuates the pump 60 and oil is forced through the pipe 62 into the outer end of the cylinder 63. The piston 64 is now in the position shown in Fig. 2, in which it closes all of the ports 76 but permits a free flow of oil from the pipe 62 through the port 68, and the oil under pressure therefore flows through this port 68 into the chamber 67, and through the pipe 69 into the cylinder 70. The pressure in this cylinder forces the piston 71 against the resistance of the spring 80 and the fork or jaw 73 carried by its piston rod moves the contact lever 74 about its pivotal mounting. This movement of the contact lever 74 operates to gradually cut resistance out of the armature circuit and this movement of the contact lever 74 continues until sufficient resistance has been cut out of the armature circuit to overcome the starting load.

As soon as the vehicle is started, the movement of the driven shaft 14 is transmitted through the transverse shaft 29 and bevel gears 30 and 31 to the driven controller shaft 23. As this driven controller shaft starts to move, the weights 48, 48 of the governor carried thereby are thrown radially outward under centrifugal force and the driving governor weights 45, 45 are moved inwardly, and the shifting sleeves 34, 35 are moved rearwardly from their extreme forward or starting position. The rearward movement of these sleeves actuates the lever 66 to move the piston 64 in the cylinder 63 forwardly and causes this piston to uncover the first of the by-pass ports 76. A part of the oil is now by-passed through these ports 76, by-pass chamber 75, and into the oil return pipe 77, and as this effects a relief of the oil pressure, the movement of the contact lever 74 which moves in response to the oil pressure is retarded. As the rearward movement of the shifting sleeves 34, 35 continues in response to the increasing speed of the driven shaft, the piston 64 is moved to uncover more by-pass ports 76, and as the oil pressure is further relieved, the spring 80 in the cylinder 70 moves the contact lever 74 rearwardly until when all the by-pass ports 76 are uncovered, the oil pressure in the cylinder 70 is completely relieved and the contact lever 74 is in its extreme rearward position in which it cuts the maximum resistance into the electro-magnetic coupling.

At the same time, the rearward movement of the shifting sleeves 34, 35 under the influence of the driven governor weights 48, 48, moves the contact lever 20 forwardly from its extreme rearward position shown in Figs. 1 and 2 in which rearward position it cuts the maximum resistance into the electro-magnetic coupling circuit. This movement of the contact lever 20 along the variable resistance or rheostat 17 progressively cuts resistance out of the circuit of the electro-magnetic coupling and consequently reduces the slippage of this coupling and increases the power and speed transmitted to the driven shaft. This operation continues until the positions of the two sets of governor weights have been equalized or substantially so, as shown by full lines in Fig. 3, at which time the maximum resistance has been cut out of the armature and the field magnet obtains a grip on the armature which causes the main driving shaft 11 to turn the main driven shaft 14 at nearly the same speed, the only difference being due to a slight slippage of the field magnet on the armature. The contact arm 74 is at this time inoperative. The movement of the governor mechanism in this direction is limited by the engagement of the driven shifting sleeve 35 with the rear stop 41 on the driver controller shaft 23.

From the foregoing it is apparent that to overcome the initial starting load, resistance is cut out of the electro-magnetic coupling by the contact lever 74 and as soon as this starting load is overcome, this contact lever is moved rearwardly and cuts resistance into the coupling. Upon further increase in speed of the driven shaft, the other contact lever 20 is moved to cut the resistance out of the coupling until at its running speed all resistance is cut out and the minimum slippage of the coupling occurs. By this means after the initial starting load has been overcome by initially cutting out the resistance, a quick but gradual pick-up or get-away in the speed of the driven shaft is effected immediately after starting the engine and throwing in the clutch without any straining of parts or clash or wear of gears.

If it is desired at any time to increase the speed in case the prime mover is a gas engine, all that is necessary is to set the throttle according to the speed desired, which will speed up the engine shaft and cause the magnetic drive to rotate the driven element faster in proportion.

In order to effect a quick get away or to effect a hard pull, the clutch is first released to permit the engine to speed up and throw the driving governor weights outwardly and cutting in more resistance in the armature, without cutting down road speed in case of an automobile. Upon quickly letting in the clutch after the engine has been thus speeded up the driven governor weights will immediately operate the rheostat lever to cut out the resistance and restore the parts to full drive position and maintain the parts in this position.

This method of operation therefore resembles the method of slipping the clutch in an ordinary drive mechanism for the purpose of permitting the engine to gain speed and then letting in the clutch gradually so that the automobile will be propelled at the same speed as the engine.

I claim as my invention:

1. An electro-magnetic transmission including a driving shaft, a driven shaft, an electro-magnetic coupling between said shafts, a rheostat in circuit with said coupling, and fluid pressure means actuated through motion derived from said driving shaft for actuating said rheostat to cut out the resistance in said circuit to overcome the starting load and means for subsequently rendering said last named means inoperative.

2. An electro-magnetic transmission including a driving shaft, a driven shaft, an electro-magnetic coupling between said shafts, a rheostat in circuit with said coupling and movable to vary the field thereof, a fluid pressure pump actuated by said driving shaft, a cylinder connected with said pump, a piston in said cylinder, means operatively connecting said piston and said rheostat whereby the fluid pressure in said cylinder actuates said rheostat to cut out the resistance in said circuit and means actuated through motion derived from said driven shaft for rendering said fluid pressure system inoperative when the starting load on said driven shaft has been overcome.

3. An electro-magnetic transmission including a driving shaft, a driven shaft, an electro-magnetic coupling between said shafts, a rheostat in circuit with said coupling and movable to vary the field thereof, a fluid pressure pump actuated by said driving shaft, a cylinder connected with said pump, a piston in said cylinder, means operatively connecting said piston and said rheostat whereby the fluid pressure in said cylinder actuates said rheostat to cut out the resistance in said circuit and means actuated through motion derived from said driven shaft for by-passing the fluid pressure from said pump and relieving the pressure in said cylinder when the starting load on said driven shaft has been overcome.

4. An electro-magnetic transmission including a driving shaft, a driven shaft, an electro-magnetic coupling between said shafts, a rheostat in circuit with said coupling and operable to vary the field thereof, a fluid pressure pump actuated by said driving shaft, a cylinder, a conduit between said cylinder and said pump, a piston in said cylinder, means operatively connecting said piston and said rheostat, means yieldingly holding said piston in a position where the maximum resistance is cut into said circuit by said rheostat, said piston being movable by the fluid delivered by said pump to actuate said rheostat to cut resistance out of said circuit, and means actuated through motion derived from said driven shaft for by-passing said fluid pressure and relieving the pressure in said cylinder after the starting load has been overcome.

5. An electro-magnetic transmission including a driving shaft, a driven shaft, an electro-magnetic coupling between said shafts, a rheostat in circuit with said coupling and operable to vary the field thereof, a fluid pressure pump actuated by said driving shaft, a cylinder, a pipe connecting said cylinder with said pump, a piston in said cylinder, means operatively connecting said piston and said rheostat, means yieldingly holding said piston in a position where the maximum resistance is cut into said circuit by said rheostat, said piston being movable by the fluid delivered by said pump to actuate said rheostat to cut resistance out of said circuit, and means actuated through motion derived from said driven shaft for by-passing said fluid pressure and relieving the pressure in said cylinder after the starting load has been overcome, comprising a member movable in response to the speed of said driven shaft, a second cylinder arranged in the pipe between said pump and said first named cylinder, a piston in said last named cylinder, a by-pass chamber arranged on one side of said last named cylinder, a return pipe communicating with said by-pass chamber, said cylinder having a port between said by-pass chamber and the interior of said cylinder, and means operatively connecting said movable member and said last named piston whereby the movement of said driven shaft moves said last named piston to uncover said by-pass port and relieve the pressure in said first named cylinder and thereby cut out the resistance in said circuit.

6. An electro-magnetic transmission including a driving shaft, a driven shaft, an electro-magnetic coupling between said shafts, a rheostat in circuit with said coupling and operable to vary the field thereof, a fluid pressure pump actuated by said driving shaft, a cylinder, a pipe connecting said cylinder with said pump, a piston in said cylinder, means operatively connecting said piston and said rheostat, means yieldingly holding said piston in a position where the maximum resistance is cut into said circuit by said rheostat, said piston being movable by the fluid delivered by said pump to actuate said rheostat to cut resistance out of said circuit, and means actuated through motion derived from said driven shaft for by-passing said fluid pressure and relieving the pressure in said cylinder after the starting load has been overcome, comprising a member movable in response to the speed of said driven shaft, a second cylinder arranged in the pipe between said pump and said first named cylinder, a piston in said last named cylinder, a by-pass chamber arranged on one side of said last named cylinder, a return pipe communicating with said by-pass chamber, said cylinder being provided with a series of ports between said by-pass chamber and the interior of said cylinder, and means operatively connecting said movable member and said last named piston whereby the movement of said driven shaft moves said last named piston to progressively uncover said by-pass ports and relieve the pressure in said first named cylinder and thereby cut out the resistance in said circuit.

7. An electro-magnetic transmission including a driving shaft, a driven shaft, an electro-magnetic coupling between said shafts, a rheostat in circuit with said coupling and varying the field thereof, a fluid pressure pump actuated by said driving shaft, a cylinder, a pipe connecting one end of said cylinder with said pump, a piston in said cylinder, a second pipe connected with the same end of said cylinder, a second cylinder connected with said second pipe, a second piston in said second cylinder, means operatively connecting said second piston with said rheostat whereby the fluid pressure in said second cylinder actuates said rheostat to cut out resistance in said circuit and means for relieving the pressure in said second cylinder upon the starting of said driven shaft comprising a movable member actuated through motion derived from said driven shaft, a by-pass chamber on said first named cylinder, said first named cylinder being provided with a series of ports between said by-pass chamber and the interior of said cylinder, a return pipe connected with said by-pass chamber, and means operatively connecting said movable member and said first named piston whereby upon the starting movement of said driven shaft said ports are progressively uncovered and an increasing amount of fluid by-passed to said return pipe.

8. An electro-magnetic transmission including a driving shaft, a driven shaft, an electro-magnetic coupling between said shafts, a rheostat in circuit with said coupling and varying the field thereof, a fluid pressure pump actuated by said driving shaft, a cylinder, a pipe connecting one end of said cylinder with said pump, a piston in said cylinder, a second pipe connected with the same end of said cylinder, a second cylinder connected with said second pipe, a second piston in said second cylinder, means operatively connecting said second piston with said rheostat whereby the fluid pressure in said second cylinder actuates said rheostat to cut out resistance in said circuit and means for relieving the pressure in said second cylinder upon the starting of said driven shaft comprising a movable member actuated through motion derived from said driven shaft, a by-pass chamber on said first named cylinder, said first named cylinder being provided with a series of ports between said by-pass chamber and the interior of said cylinder, a return pipe connected with said by-pass chamber, means operatively connecting said movable member and said first named piston whereby upon the starting movement of said driven shaft said ports are progressively uncovered and an increasing amount of fluid by-passed to said return pipe, and means for limiting the effective pressure of said pump comprising a by-pass pipe between said first named pipe and said return pipe and a safety valve in said by-pass pipe.

9. An electro-magnetic transmission including a driving shaft, a driven shaft, a magnetic coupling interposed between said driving and driven shafts, means for automatically controlling the picking up effect of said coupling including a driving controller shaft operatively connected with the driving shaft and a driven controller shaft operatively connected with said driven shaft, a driving governor member mounted on said driving controller shaft and movable radially outward relative thereto under centrifugal force, a driven governor member mounted on said driven controller shaft and movable radially outward relative thereto under centrifugal force and operatively connected with said driven governor member, a rheostat in circuit with said coupling, means for actuating said rheostat by motion derived from said governor members to cut out the resistance in said circuit as the speed of said driven shaft increases, means actuated through motion derived from said driving shaft for cutting out said resistance to overcome the starting load on said driven shaft, and means actuated through motion derived from said governor members for rendering said last named means inoperative after the starting load has been overcome.

10. An electro-magnetic transmission including a driving shaft, a driven shaft, a magnetic coupling interposed between said shafts, a rheostat controlling the field of said coupling, said rheostat including a series of contacts and a pair of contact levers in circuit with said coupling and engaging said contacts, means for automatically controlling the picking up effect of said coupling including a driving controller shaft operatively connected with said driving shaft, a driven controller shaft operatively connected with said driven shaft, a driving governor member mounted on said driving controller shaft and movable radially outward relative thereto under centrifugal force, a driven governor member mounted on said driven controller shaft and movable radially outward relative thereto under centrifugal force and operatively connected with said driven governor member, means for actuating one contact lever of said rheostat through motion derived from said governor members to cut out the resistance in said circuit as the speed of said driven shaft increases, means actuated through motion derived from said driving shaft for actuating the other contact lever of said rheostat to cut out the resistance in said circuit and to thereby overcome the starting load on said driven shaft, and means actuated through motion derived from said governor members for rendering said last named contact lever inoperative after the starting load has been overcome.

In testimony whereof I hereby affix my signature.

JOHN G. FRANK.